United States Patent
Chatterjee et al.

(10) Patent No.: US 12,143,971 B2
(45) Date of Patent: Nov. 12, 2024

(54) UE FALLBACK BEHAVIOR FOR CAPABILITY #2 AND MULTIPLE PDSCH/PUSCH PER SLOT IN NR

(71) Applicant: Apple Inc., Cupertino, CA (US)

(72) Inventors: Debdeep Chatterjee, San Jose, CA (US); Christiane Senger, Duisburg (DE)

(73) Assignee: Apple Inc., Cupertino, CA (US)

( * ) Notice: Subject to any disclaimer, the term of this patent is extended or adjusted under 35 U.S.C. 154(b) by 543 days.

(21) Appl. No.: 17/435,835

(22) PCT Filed: Mar. 27, 2020

(86) PCT No.: PCT/US2020/025394
§ 371 (c)(1),
(2) Date: Sep. 2, 2021

(87) PCT Pub. No.: WO2020/205590
PCT Pub. Date: Oct. 8, 2020

(65) Prior Publication Data
US 2022/0159651 A1    May 19, 2022

(51) Int. Cl.
*H04W 72/0446* (2023.01)
(52) U.S. Cl.
CPC .............................. *H04W 72/0446* (2013.01)
(58) Field of Classification Search
CPC ................................................ H04W 72/0446
USPC ........................................................ 370/336
See application file for complete search history.

(56) References Cited

PUBLICATIONS

PCT Search Report dated Jun. 15, 2020 in connection with PCT Application No. PCT/US2020/025394.
PCT Written Opinion dated Jun. 15, 2020 in connection with PCT Application No. PCT/US2020/025394.
Intel Corporation: "Miscellaneous corrections" 3GPP Draft; R2-1902090; vol. RAN WG2; Feb. 15, 2019; URL:http://www.3gpp.org/ftp/tsg%5Fran/WG2%5FRL2/TSGR2%5F105/Docs/R2%2DI902090%2Ezip.
"Technical Specification Group Radio Access; Network; NR; Radio Resource Control (RRC) protocol specification; (Release 15)"; 3GPP Draft; 38.331-F40; Jan. 14, 2019; URL:http://www.3gpp.org/ftp/3guinternal/3GPP%5Fultimate%5Fversions%5Fto%5Fbe%5Ftransposed/sentToDpc/38331%2Df40%2Ezip.
"Technical Specification Group Radio Access Network; NR; User Equipment (UE) radio access capabilities; (Release 15)"; 3GPP Draft; 38.306-F40; Jan. 17, 2019; URL:http://www.3gpp.org/ftp/tsg%5Fran/WG2%5FRL2/Specifications/201812%5Ffinal%5Fspecs%5Fafter%5FRAN%5F82/38306%2Df40%2Ezip.

(Continued)

*Primary Examiner* — Angel T Brockman
(74) *Attorney, Agent, or Firm* — Eschweiler & Potashnik, LLC (57) ABSTRACT

Systems, methods, and circuitries are provided for determining fallback behavior in a user equipment (UE) wireless communication device. The method includes signaling an enhanced processing time capability and fallback type to the wireless network, wherein the processing time capability includes respective numbers of transport blocks per slot the UE can process mapped to different respective specified numbers of serving cells. A number of configured serving cells that support the enhanced processing time capability is determined. The method includes determining, based on the number of configured serving cells, a maximum number of transport blocks per slot that will be communicated between the UE and the configured serving cells. A fallback behavior based on the determined maximum number of transport blocks per slot and the fallback type is determined.

18 Claims, 3 Drawing Sheets

(56) References Cited

PUBLICATIONS

"Technical Specification Group Radio Access; Network; NR; Radio Resource Control (RRC) protocol specification"; version 15.4.0; 3GPP Draft; 38.331; Dec. 2018; pp. 111-259, 261-474.
International Preliminary Report on Patentability dated Sep. 28, 2021 in connection with PCT Application No. PCT/US2020/025394.

UE FALLBACK BEHAVIOR FOR CAPABILITY #2 AND MULTIPLE PDSCH/PUSCH PER SLOT IN NR

CROSS REFERENCE TO RELATED APPLICATIONS

This application is a National Phase entry application of International Patent Application No. PCT/US2020/025394 filed Mar. 27, 2020, which claims priority to U.S. Provisional Patent Application No. 62/826,890 filed on Mar. 29, 2019, entitled "ON CAPABILITY #2 AND MULTIPLE PDSCH/PUSCH PER SLOT IN NR," which is incorporated herein by reference for all purposes.

BACKGROUND

In New Radio (NR) systems, when a user equipment (UE) device enters a new cell, a registration process is performed in which the UE signals its various capabilities to a network (NW) node for the cell.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 1:
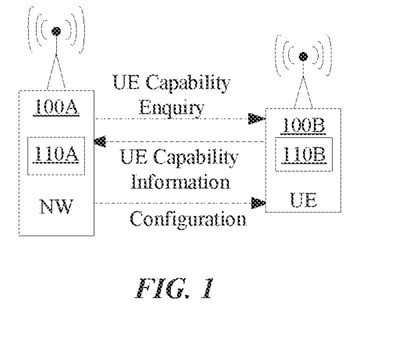
FIG. 1 is a block diagram illustrating an example wireless communication network, according to various aspects disclosed.
Figure 1A:
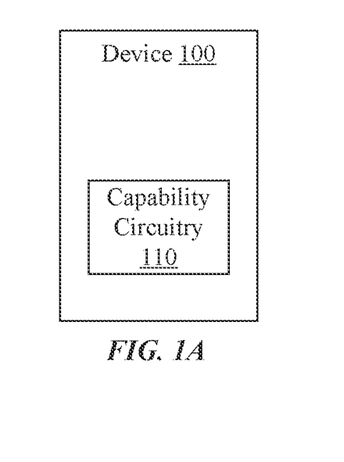
FIG. 1A is a block diagram illustrating an example wireless communication device configured to support communication of signal processing capabilities between a UE and a NW node, according to various aspects disclosed.
Figure 5:
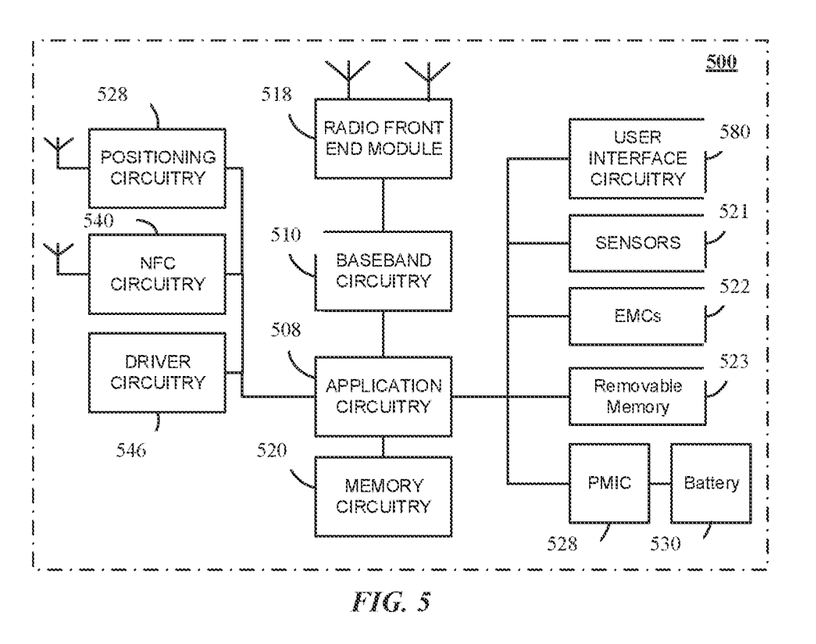
FIG. 5 illustrates an example of a user equipment device (e.g., UE), in accordance with various aspects disclosed.

FIG. 1 illustrates a wireless network that includes a network (NW) node (e.g., Next Generation NodeB (gNB)) 100A and a user equipment device 100B. An example wireless communication network is described in more detail with reference to FIG. 3 in which the NW node 100A is illustrated as a RAN node 311 and UE 100B is illustrated as UE 300. As shown in FIG. 1A, the wireless communication devices 100A and 100B include capability circuitry 110 (e.g., a baseband processor or one or more processors) that is configured to cause the device to communicate certain processing capabilities of the UE and serving cells in the network. In the following description, when a device 100 is described as performing some function, it is to be understood that the capability circuitry 110 is causing the device to perform the function. In one example, the capability circuity 110 includes a processor (e.g., a baseband processor) executing stored instructions to transmit/receive information describing processing capabilities of the UE and/or serving cells in the network. An example NW node device is illustrated in FIG. 5 and an example UE device is illustrated in FIG. 6.

In one example, when the UE 100B enters the network, a registration procedure is performed. The NW node 100A sends a UE capability enquiry to the UE 100B. The UE 100B responds by signaling UE capability information. Based on this capability information, the network configures one or more serving cells for communication with the UE and the serving cell configuration is transmitted by the NW node 100A to the UE 100B.

Described herein are systems, methods, and circuitries for determining a maximum number of transport blocks (TB) that a UE expects to receive per slot. This determined maximum number of TBs is used by the UE to determine a fallback behavior, as will be described in more detail below. For the purposes of this description, the term TB is used as a shorthand tor refer to a downlink (DL) data transmission by way of the physical downlink shared channel (PDSCH) and/or uplink (UL) data transmission by way of the physical uplink shared channel (PUSCH). For the purposes of this description, the terms "carrier" and "serving cell" are used interchangeably.

Currently, as part of the UE capability reporting framework of Rel-15 NR, the UE can indicate its capability on the number of DL (UL respectively) component carriers (CCs) it can support in a band per band-combination when operating with Capability #2 UE minimum processing times for PDSCH processing and PUSCH preparation. This Capability #2 is referred to broadly herein as "enhanced processing time capability". Capability #2 processing time indicates that the processing time for preparing UL signals and processing DL signals is shortened as compared to Capability #1. This is according to Feature Group (FG) # "1 [5-5a]" and FG # "3 [5-5c]" in R1-1903817. Further, the UE can indicate a different numbers of DL (and UL respectively) CCs it can support in a band per band-combination for Capability #2 UE minimum processing times and with different maximum numbers of TBs (e.g., PDSCHs and/or PUSCHs) in a slot. This is according to Feature Group (FG) #5 [5-13] through FG #14 [5-13f] in R1-1903817. The serving cell configuration (e.g., "actual CA") provided to the UE includes an indication as to which (if any) of the serving cells supports Capability #2.

When the number of CCs specified in the UE capability information are exceeded by the actual CA (e.g., serving cell) configuration, the UE is expected to apply fallback behavior as follows. If the number of configured carriers in a band is less than or equal to a UE's "advertised" capability of X carriers, the UE supports Capability #2 processing on all of the configured serving cells. If the number of configured carriers exceeds the UE's capability, the UE can exhibit at least two types of fallback behavior, specified in the capability information as Fallback='SC' or 'Cap1-only'. If Fallback='SC', the UE supports Capability #2 processing time on lowest cell index among the configured carriers in the band where the value is reported. If Fallback='Cap1-only', the UE supports only Capability #1, in the band where the value is reported.

While the UE, that indicates capability of supporting Capability #2 UE minimum processing times, is configured by higher layers whether it may expect timing for PDSCH-to-HARQ-ACK for DL (and timing for PDCCH-to-PUSCH for UL respectively) in each serving cell, the UE does not have the information on whether it may be scheduled with up to 1, 2, 4, or 3 PDSCHs or PUSCHs within a slot duration. Thus, there is currently no way for the UE to ascertain the maximum number of PDSCHs/PUSCHs that it may be scheduled with within a slot in a serving cell, and thereby, it cannot determine correctly when the "fallback behavior" should apply.

This ambiguity in UE behavior for a UE that indicates support of Capability #2 UE minimum processing times and support of different (>1) max numbers of PDSCH/PUSCHs in a slot can be avoided by programming the UE to make certain assumptions when determining whether the fallback behavior should be used. As described above, for a UE that indicates capability to support Cap #2 UE minimum processing times and different max numbers of PDSCHs/PUSCHs per slot (the max value being one of $\{2, 4, 3\}$) and correspondingly different numbers of DL/UL CCs with Cap #2 UE minimum processing times, there remains ambiguity at the UE in determining when the configured number of serving cells is interpreted to exceed the indicated capability resulting in fallback behavior.

The signaling framework is shown below [TS38.331, v15.4.0 (Jan. 14, 2019)]:
ProcessingParameters The IE ProcessingParameters is used to indicate PDSCH/PUSCH processing capabilities supported by the UE.

```
ProcessingParameters information element
ProcessingParameters ::=       SEQUENCE {
   fallback              ENUMERATED {sc, cap1-only},
   differentTB-PerSlot           SEQUENCE {
      upto1       NumberOfCarriers    OPTIONAL,
      upto2       NumberOfCarriers    OPTIONAL,
      upto4       NumberOfCarriers    OPTIONAL,
      upto7       NumberOfCarriers    OPTIONAL
   } OPTIONAL
}
NumberOfCarriers ::=  INTEGER (1..16)
```

The main reason for this ambiguity is the fact that UE does not know how many TBs per slot might be scheduled on one CC with Cap #2 enabled and hence cannot map CCs to upto1, upto2, and so on. UE still doesn't know how many PDSCHs per slot might be scheduled on a CC. However, by way of the RRC signaling for Cap #2 for serving cells available (via processingType2Enabled parameter inside PDSCH-ServingCellConfig ServingCellConfig or PUSCH-ServingCellConfig), the UE can know how many and which serving cells are configured with Capability #2 UE minimum UE processing times.

Next, considering the case of PDSCH scheduling in the DL (the UL case with PUSCH can follow exactly same principles), let's assume the UE reports four specified numbers of configured cells $X\_1$, $X\_2$, $X\_4$, and $X\_7$ for the maximum number of DL CCs it can support with Cap #2 when combined with up to 1, 2, 4, or 3 PDSCHs (referred to as number of TBs in the quoted excerpt from TS38.331, v15.4.0) per slot. Further, it would be reasonable to assume that $X\_1$ $X\_2$ $X\_4$ $X\_7$. Note that the UE may report a subset of these values, and in such cases, the principles outlined here can still apply.

Accordingly, in an embodiment, the ambiguity at the UE can be avoided by defining the following set of UE assumptions:

When configured with less than or equal to $X\_k$ (k=3, 4, 2, 1) DL CCs (with Cap #2 on all or a sub-set of the serving cells), the UE may expect to be scheduled with up to k PDSCHs per slot with Cap #2 on all of the configured serving cells for which processingType2Enabled is indicated.

When configured with more than $X\_1$ DL CCs (with Cap #2 on all or a sub-set of the serving cells), the UE may expect to be scheduled with up to max $\{k\}$ PDSCHs per slot with Cap #2 on the serving cell with the lowest serving cell index of all serving cells for which processingType2Enabled is indicated for a UE reporting Fallback='SC', and with Cap #1 on all serving cells for a UE reporting Fallback='Cap1-only'. Here, max $\{k\}$ indicates the maximum of the set of "k" values (out of $\{1, 2, 4, 3\}$) reported by the UE as part of the ProcessingParameters structure for PDSCH.

Further as an alternative (to simplify the procedure), when configured with more than $X\_1$ DL CCs (with Cap #2 on all or a sub-set of the serving cells), the UE considers this as an error case, that is, the fallback behavior is not followed.

Further, as a first alternative or addition, when configured with $X\_c$ DL CCs, such that $X\_1 \geq X\_c > X\_j$, where j (from $\{2, 4, 3\}$) is the smallest value (greater than 1) reported by the UE for the max number of PDSCHs in a slot, (with Cap #2 on all or a sub-set of the serving cells), the UE may expect to be scheduled with up to j PDSCHs per slot with Cap #2 on the serving cell with the lowest serving cell index of all serving cells for which processingType2Enabled is indicated for a UE reporting Fallback='SC', and with Cap #1 on all serving cells for a UE reporting Fallback='Cap1-only'.

Without the first alternative or addition above, the UE would expect to be scheduled with up to one PDSCH per slot but with Cap #2 on all indicated CCs whenever number of configured serving cells exceeds $X\_j$ but less than $X\_1$. With the first alternative or addition above, the UE would expect to be scheduled with up to j PDSCHs per slot but limited to Cap #2 only on the lowest serving cell index of all serving cells for which processingType2Enabled is indicated for a UE reporting Fallback='SC', and with Cap #1 on all serving cells for a UE reporting Fallback='Cap1-only'.

Following are one or more flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein the term generate, when used with reference to a signal, should be construed broadly as encompassing any manner of calculating, computing, selecting from amongst stored signal options, or otherwise determining a signal using a processor and processing the signal for communication to another device.

Figure 2:
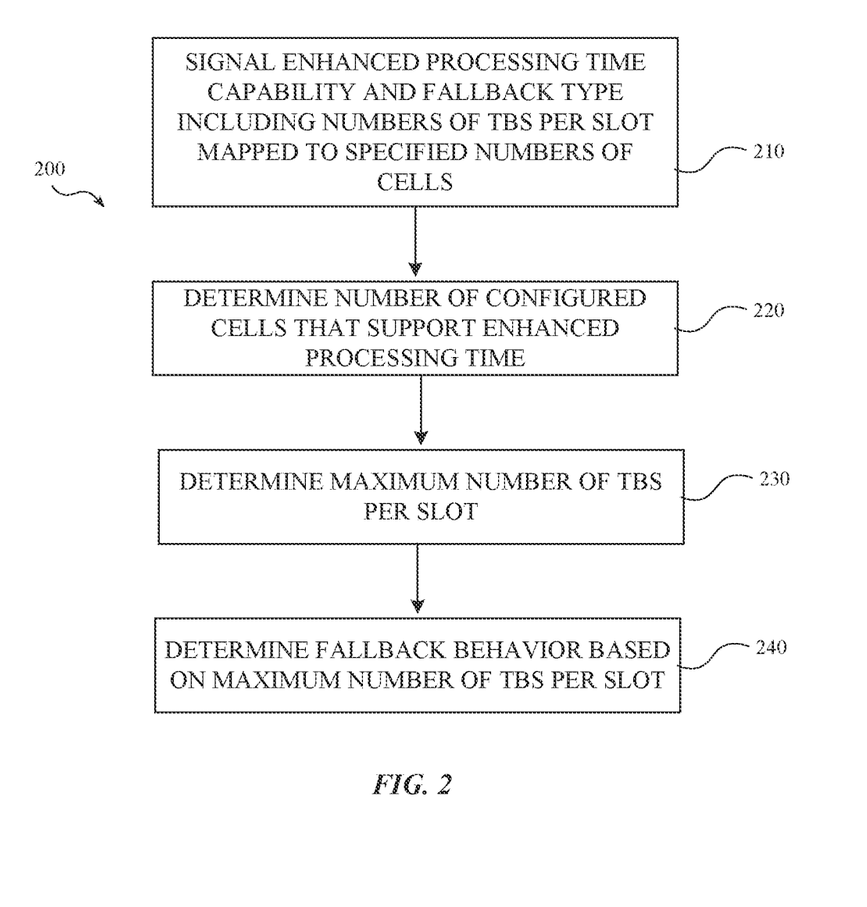
FIG. 2 is a flow diagram illustrating an example method for determining a fallback behavior in a UE, according to various aspects disclosed.

FIG. 2 depicts a flow diagram outlining an example method 200 for determining fallback behavior in a user equipment (UE) wireless communication device. The method 200 may be performed by capability circuitry 110 of FIG. 1. The method includes, at 210, signaling an enhanced processing time capability and fallback type to the wireless network, wherein the processing time capability includes respective numbers of transport blocks per slot the UE can process mapped to different respective specified numbers of serving cells. At 220 a number of configured serving cells that support the enhanced processing time capability is determined. The method includes, at 230, determining, based on the number of configured serving cells, a maximum number of transport blocks per slot that will be communicated between the UE and the configured serving cells. A fallback behavior based on the determined maximum number of transport blocks per slot and the fallback type is determined at 240.

Figure 3:
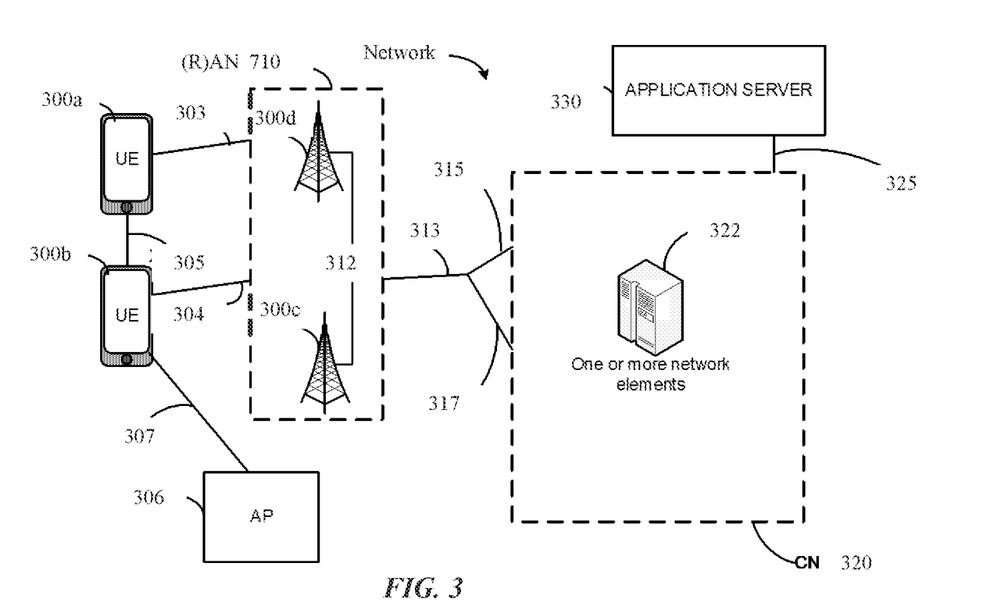
FIG. 3 illustrates an example communication network, in accordance with various aspects disclosed.

FIG. 3 illustrates an example architecture of a communication network, in accordance with various embodiments. The following description is provided for an example network that operates in conjunction with the LTE system standards and 4G or NR system standards as provided by 6GPP technical specifications. However, the example embodiments are not limited in this regard and the described embodiments may apply to other networks that benefit from the principles described herein, such as future 6GPP systems (e.g., Sixth Generation (6G)) systems, IEEE 402.16 protocols (e.g., WMAN, WiMAX, etc.), or the like.

As shown by FIG. 3, the network includes UE 300a and UE 300b (collectively referred to as "UEs 300" or "UE 300"). In this example, UEs 300 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 300 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 300 may be configured to connect, for example, communicatively couple, with a RAN 310. In embodiments, the RAN 310 may be an NG RAN or a 4G RAN, an E-UTRAN, or a legacy RAN, such as a UTRAN or GERAN. As used herein, the term "NG RAN" or the like may refer to a RAN 310 that operates in an NR or 4G system 300, and the term "E-UTRAN" or the like may refer to a RAN 310 that operates in an LTE or 3G system 300. The UEs 300 utilize connections (or channels) 303 and 304, respectively, each of which comprises a physical communications interface or layer (discussed in further detail below).

In this example, the connections 303 and 304 are illustrated as an air interface to enable communicative coupling, and can be consistent with cellular communications protocols, such as a GSM protocol, a CDMA network protocol, a PTT protocol, a POC protocol, a UMTS protocol, a 6GPP LTE protocol, a 4G protocol, a NR protocol, and/or any of the other communications protocols discussed herein. In embodiments, the UEs 300 may directly exchange communication data via a ProSe interface 305. The ProSe interface 305 may alternatively be referred to as a SL interface 305 and may comprise one or more logical channels, including but not limited to a PSCCH, a PSSCH, a PSDCH, and a PSBCH.

The UE 300b is shown to be configured to access an AP 306 (also referred to as "WLAN node 306," "WLAN 306," "WLAN Termination 306," "WT 306" or the like) via connection 307. The connection 307 can comprise a local wireless connection, such as a connection consistent with any IEEE 402.11 protocol, wherein the AP 306 would comprise a wireless fidelity (Wi-Fi®) router. In this example, the AP 306 is shown to be connected to the Internet without connecting to the core network of the wireless system (described in further detail below). In various embodiments, the UE 300b, RAN 310, and AP 306 may be configured to utilize LWA operation and/or LWIP operation. The LWA operation may involve the UE 300b in RRC_CONNECTED being configured by a RAN node 311a-b to utilize radio resources of LTE and WLAN. LWIP operation may involve the UE 300b using WLAN radio resources (e.g., connection 307) via IPsec protocol tunneling to authenticate and encrypt packets (e.g., IP packets) sent over the connection 307. IPsec tunneling may include encapsulating the entirety of original IP packets and adding a new packet header, thereby protecting the original header of the IP packets.

The RAN 310 can include one or more AN nodes or RAN nodes 311a and 311b (collectively referred to as "RAN nodes 311" or "RAN node 311") that enable the connections 303 and 304. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 311 that operates in an NR or 4G system 300 (for example, a NW node), and the term "E-UTRAN node" or the like may refer to a RAN node 311 that operates in an LTE or 3G system 300 (e.g., an eNB). According to various embodiments, the RAN nodes 311 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, a downlink resource grid can be used for downlink transmissions from any of the RAN nodes 311 to the UEs 300, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 300 and the RAN nodes 311 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 300 MHz to approximately 6.8 GHz, whereas the unlicensed spectrum may include the 4 GHz band.

To operate in the unlicensed spectrum, the UEs 300 and the RAN nodes 311 may operate using LAA, eLAA, and/or feLAA mechanisms. In these implementations, the UEs 300 and the RAN nodes 311 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 300, RAN nodes 311, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 4 GHz band are WLANs based on IEEE 402.11 technologies. WLAN employs a contention-based channel access mechanism, called CSMA/CA. Here, when a WLAN node (e.g., a mobile station (MS) such as UE 300, AP 306, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 5 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 6, 4, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different path losses. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 300 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 300. The PDCCH carries information about the transport format and resource allocations related to the PDSCH channel, among other things. It may also inform the UEs 300 about the transport format, resource allocation, and HARQ information related to the uplink shared channel. Typically, downlink scheduling (assigning control and shared channel resource blocks to the UE 300*b* within a cell) may be performed at any of the RAN nodes 311 based on channel quality information fed back from any of the UEs 300. The downlink resource assignment information may be sent on the PDCCH used for (e.g., assigned to) each of the UEs 300.

The RAN 310 is shown to be communicatively coupled to a core network—in this embodiment, core network (CN) 320. The CN 320 may comprise a plurality of network elements 322, which are configured to offer various data and telecommunications services to customers/subscribers (e.g., users of UEs 300) who are connected to the CN 320 via the RAN 310. The components of the CN 320 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 320 may be referred to as a network slice, and a logical instantiation of a portion of the CN 320 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 4:
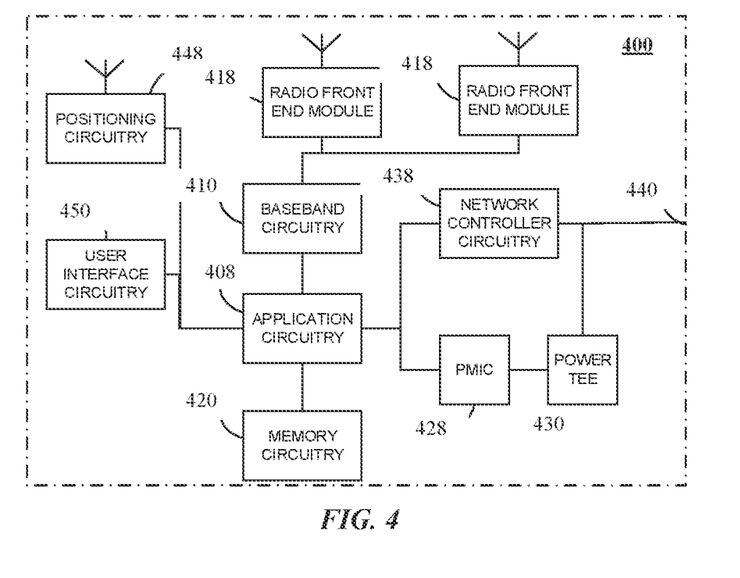
FIG. 4 illustrates an example of an infrastructure equipment device (e.g., NW node or gNB/eNB), in accordance with various aspects disclosed.

FIG. 4 illustrates an example of infrastructure equipment device 400 in accordance with various embodiments. The infrastructure equipment device 400 (or "device 400") may be implemented as a base station, radio head, RAN node such as the RAN nodes 311 and/or AP 306 shown and described previously, application server(s) 330, and/or any other element/device discussed herein. In other examples, the device 400 could be implemented in or by a UE. The device 400 may be configured to configure serving cells for a UE based on UE capabilities received from the UE.

The system 400 includes application circuitry 405, baseband circuitry 410 (e.g., CSI/DRS circuitry 110 of FIG. 1A), one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 4GC, for example.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system.

Other bus/IX systems may be included, such as an I2C interface, an SPI interface, point to point interfaces, and a power bus, among others.

FIG. 5 illustrates an example of a device 500 in accordance with various embodiments. In embodiments, the device 500 may be suitable for use as UE 100A of FIG. 1, UE 300 of FIG. 3, and/or any other element/device discussed herein. The device 500 may include any combinations of the components shown in the example. The device 500 may be configured to generate and transmit UE capability information and to determine fallback behavior as described herein. The components of device 500 may be implemented as integrated circuits (ICs), portions thereof, discrete electronic devices, or other modules, logic, hardware, software, firmware, or a combination thereof adapted in the device 500, or as components otherwise incorporated within a chassis of a larger system. The block diagram of FIG. 5 is intended to show a high level view of components of the device 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the device 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 505 may include a general or special purpose processor, such as an A-series processor (e.g., the A13 Bionic), available from Apple® Inc., Cupertino, CA or any other such processor. The processors of the application circuitry 505 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package.

The baseband circuitry 510 (e.g., CSI/DRS circuitry 110 of FIG. 1A) may be implemented, for example, as a solder-down substrate including one or more integrated circuits, a single packaged integrated circuit soldered to a main circuit board or a multi-chip module containing two or more integrated circuits.

The device 500 may also include interface circuitry (not shown) that is used to connect external devices with the device 500. The external devices connected to the device 500 via the interface circuitry include sensor circuitry 521 and electro-mechanical components (EMCs) 522, as well as removable memory devices coupled to removable memory circuitry 523.

A battery 530 may power the platform 500, although in some examples the device 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus for a user equipment (UE) wireless communication device (device) in a wireless network, including one or more processors configured to cause the device to signal an enhanced processing time capability and fallback type to the wireless network, wherein the processing time capability includes respective numbers of transport blocks per slot the UE can process mapped to different respective specified numbers of serving cells; determine a number of configured serving cells that support the enhanced processing time capability; determine, based on the number of configured serving cells, a maximum number of transport blocks per slot that will be communicated between the UE and the configured serving cells; and determine a fallback behavior based on the determined maximum number of transport blocks per slot and the fallback type.

Example 2 includes the subject matter of example 1, including or omitting optional elements, wherein the one or more processors are configured to cause the device to: when the number of configured serving cells is less than or equal to a specified number of serving cells in the enhanced processing time capability, determine the maximum number of transport blocks based on an assumption that a number of transport blocks per slot mapped to the specified number of serving cells in the enhanced processing time capability is received from all of the configured serving cells.

Example 3 includes the subject matter of example 1, including or omitting optional elements, wherein the one or more processors are configured to cause the device to: when the number of configured serving cells exceeds a maximum specified number of serving cells in the enhanced processing time capability, determine the maximum number of transport blocks based on an assumption that a maximum of the number of transport blocks per slot mapped to a specified number of serving cells is received from a configured serving cell having a lowest index number.

Example 4 includes the subject matter of example 1, including or omitting optional elements, wherein the one or more processors are configured to cause the device to: when the number of configured serving cells is less than a maximum specified number of serving cells but greater than minimum specified number of serving cells in the enhanced processing time capability, determine the maximum number of transport blocks based on an assumption that a number of transport blocks per slot mapped to the minimum specified number of serving cells is received from a configured serving cell having a lowest index number.

Example 5 includes the subject matter of example 1, including or omitting optional elements, wherein the minimum specified number of serving cells is greater than 1.

Example 6 includes the subject matter of any one of examples 1-5, including or omitting optional elements, wherein the one or more processors are configured to cause the device to: when the number of configured serving cells exceeds a maximum specified number of serving cells in the enhanced processing time capability, refrain from following fallback behavior specified by the fallback type.

Example 7 includes the subject matter of any one of examples 1-5, including or omitting optional elements, wherein the one or more processors are configured to cause the device to: receive, from the network, a serving cell configuration that identifies the configured serving cells that support the enhanced processing time capability.

Example 8 includes the subject matter of example 7, including or omitting optional elements, wherein the one or more processors are configured to cause the device to: determine the number of configured serving cells that support the enhanced processing time capability based on a processingType2Enabled indication in a PDSCH-Serving-CellConfiguration received by way of radio resource control signaling from the network.

Example 9 includes the subject matter of any one of examples 1-5, including or omitting optional elements, wherein the one or more processors are configured to cause the device to: signal the enhanced processing time capability using a ProcessingParameters information element.

Example 10 is a method, including, with a user equipment (UE) wireless communication device (device) in a wireless network: signaling an enhanced processing time capability and fallback type to the wireless network, wherein the processing time capability includes respective numbers of transport blocks per slot the UE can process mapped to different respective specified numbers of serving cells; determining a number of configured serving cells that support the enhanced processing time capability; determining, based on the number of configured serving cells, a maximum number of transport blocks per slot that will be communicated between the UE and the configured serving cells; and determining a fallback behavior based on the determined maximum number of transport blocks per slot and the fallback type.

Example 11 includes the subject matter of example 10, including or omitting optional elements, including: when the number of configured serving cells is less than or equal to a specified number of serving cells in the enhanced processing time capability, determining the maximum number of transport blocks based on an assumption that a number of transport blocks per slot mapped to the specified number of serving cells in the enhanced processing time capability is received from all of the configured serving cells.

Example 12 includes the subject matter of example 10, including or omitting optional elements, including: when the number of configured serving cells exceeds a maximum specified number of serving cells in the enhanced processing time capability, determining the maximum number of transport blocks based on an assumption that a maximum of the number of transport blocks per slot mapped to a specified number of serving cells is received from a configured serving cell having a lowest index number.

Example 13 includes the subject matter of example 10, including or omitting optional elements, including: when the number of configured serving cells is less than a maximum specified number of serving cells but greater than minimum specified number of serving cells in the enhanced processing time capability, determining the maximum number of transport blocks based on an assumption that a number of transport blocks per slot mapped to the minimum specified number of serving cells is received from a configured serving cell having a lowest index number.

Example 14 includes the subject matter of example 13, including or omitting optional elements, wherein the minimum specified number of serving cells is greater than 1.

Example 15 includes the subject matter of any one of examples 10-15, including or omitting optional elements, including: when the number of configured serving cells exceeds a maximum specified number of serving cells in the enhanced processing time capability, refraining from following fallback behavior specified by the fallback type.

Example 16 includes the subject matter of any one of examples 10-15, including or omitting optional elements, including: receiving, from the network, a serving cell configuration that identifies the configured serving cells that support the enhanced processing time capability.

Example 17 includes the subject matter of example 16, including or omitting optional elements, including: determining the number of configured serving cells that support the enhanced processing time capability based on a processingType2Enabled indication in a PDSCH-Serving-CellConfiguration received by way of radio resource control signaling from the network.

Example 18 includes the subject matter of any one of examples 10-15, including or omitting optional elements, including: signaling the enhanced processing time capability using a ProcessingParameters information element.

Example 19 is an apparatus for a wireless communication device (device) in a wireless network, including one or more processors configured to cause the device to: receive signaling from a user equipment (UE) communicating an enhanced processing time capability and fallback type, wherein the processing time capability includes respective numbers of transport blocks per slot the UE can process mapped to different respective specified numbers of serving cells; and configure serving cells for communication with the UE based on the signaling.

Example 20 includes the subject matter of 19, including or omitting optional elements, including: wherein the signaling includes a ProcessingParameters information element.

Example A may include a method for new radio (NR) communications, wherein the UE indicating capability of UE minimum processing times per Capability #2 and capability of supporting up to N (N>1) PDSCHs/PUSCHs within a slot, determines the maximum number of PDSCHs/PUSCHs it may be scheduled with implicitly based on the CA configuration and configuration of Capability #2 processing times for one or more of the serving cells.

Example B may include the method of example A or some other example herein, wherein the UE reports X_1, and one or more of: {X_2, X_4, and X_7} for the maximum number of DL CCs it can support with Cap #2 when combined with up to 1, 2, 4, or 3 PDSCHs (referred to as number of TBs in the quoted excerpt from TS38.331, v15.4.0) per slot, and X_1≥X_2≥X_4≥X_7.

Example C may include the method of example B or some other example herein, wherein when configured with less than or equal to X_k (k=3, 4, 2, 1) DL CCs (with Cap #2 on all or a sub-set of the serving cells), the UE may expect to be scheduled with up to k PDSCHs per slot with Cap #2 on all of the configured serving cells for which processingType2Enabled is indicated.

Example D may include the method of example B or some other example herein, wherein when configured with more than X_1 DL CCs (with Cap #2 on all or a sub-set of the serving cells), the UE may expect to be scheduled with up to max {k} PDSCHs per slot with Cap #2 on the serving cell with the lowest serving cell index of all serving cells for which processingType2Enabled is indicated for a UE reporting Fallback='SC', and with Cap #1 on all serving cells for a UE reporting Fallback='Cap1-only'. Here, max {k} indicates the maximum of the set of "k" values (out of {1, 2, 4, 3}) reported by the UE as part of the ProcessingParameters structure for PDSCH.

Example E may include the method of example B or some other example herein, wherein when configured with X_c DL CCs, such that X_1≥X_c>X_j, where j (from {2, 4, 3}) is the smallest value (greater than 1) reported by the UE for the max number of PDSCHs in a slot, (with Cap #2 on all or a sub-set of the serving cells), the UE may expect to be scheduled with up to j PDSCHs per slot with Cap #2 on the serving cell with the lowest serving cell index of all serving cells for which processingType2Enabled is indicated for a UE reporting Fallback='SC', and with Cap #1 on all serving cells for a UE reporting Fallback='Cap1-only'.

Example F may include the method of example B or some other example herein, wherein when configured with more than X_1 DL CCs (with Cap #2 on all or a sub-set of the serving cells), the UE considers this as an error case, that is, the fallback behavior is not followed.

Example G may include a method of operating a UE, the method comprising: indicating a capability of UE minimum processing times per Capability #2 and capability of supporting up to N (N>1) PDSCHs/PUSCHs within a slot; determining a maximum number of PDSCHs/PUSCHs with which the UE may be scheduled implicitly based on a CA configuration and configuration of Capability #2 processing times for one or more of the serving cells.

Example H may include the method of example C or some other example herein, further comprising: reporting X_1, and one or more of: {X_2, X_4, and X_7} for the maximum number of DL CCs the UE can support with Cap #2 when combined with up to 1, 2, 4, or 3 PDSCHs per slot, and X_1≥X_2≥X_4≥X_7.

Example I may include the method of example D or some other example herein, wherein when configured with less than or equal to X_k (k=3, 4, 2, 1) DL CCs (with Cap #2 on all or a sub-set of the serving cells), the method comprises expecting to be scheduled with up to k PDSCHs per slot with Cap #2 on all of the configured serving cells for which processingType2Enabled is indicated.

Example J may include the method of example D or some other example herein, wherein when configured with more than X_1 DL CCs (with Cap #2 on all or a sub-set of the serving cells), the method comprises expecting to be scheduled with up to max {k} PDSCHs per slot with Cap #2 on the serving cell with the lowest serving cell index of all serving cells for which processingType2Enabled is indicated for a UE reporting Fallback='SC', and with Cap #1 on all serving cells for a UE reporting Fallback='Cap1-only'. Here, max {k} indicates the maximum of the set of "k" values (out of {1, 2, 4, 3}) reported by the UE as part of the ProcessingParameters structure for PDSCH.

Example K may include the method of example D or some other example herein, wherein when configured with X_c DL CCs, such that X_1≥X_c>X_j, where j (from {2, 4, 3}) is the smallest value (greater than 1) reported by the UE for the max number of PDSCHs in a slot, (with Cap #2 on all or a sub-set of the serving cells), the method comprises expecting to be scheduled with up to j PDSCHs per slot with Cap #2 on the serving cell with the lowest serving cell index of all serving cells for which processingType2Enabled is indicated for a UE reporting Fallback='SC', and with Cap #1 on all serving cells for a UE reporting Fallback='Cap1-only'.

Example L may include the method of example D or some other example herein, wherein when configured with more than X_1 DL CCs (with Cap #2 on all or a sub-set of the serving cells), the method comprises determining an error case and not following the fallback behavior.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising a memory and one or more processors configured to, when executing instructions stored in the memory, cause the UE to:
    signal an enhanced processing time capability and fallback type to a base station, wherein the enhanced processing time capability includes respective numbers of transport blocks per slot the UE can process mapped to different respective specified numbers of serving cells;
    determine a number of configured serving cells that support the enhanced processing time capability;
    determine, based on the number of configured serving cells, a maximum number of transport blocks per slot that will be communicated between the UE and the configured serving cells; and
    determine a fallback behavior based on the determined maximum number of transport blocks per slot and the fallback type, wherein when the number of configured serving cells exceeds a maximum number of serving cells specified in the enhanced processing time capability, the fallback behavior specified by the fallback type is not performed.

2. The UE of claim 1, wherein the one or more processors are configured to cause the UE to:
when the number of configured serving cells is less than or equal to a specified number of serving cells in the enhanced processing time capability, determine the maximum number of transport blocks based on an assumption that a number of transport blocks per slot mapped to the specified number of serving cells in the enhanced processing time capability is received from all of the configured serving cells.

3. The UE of claim 1, wherein the one or more processors are configured to cause the UE to:
when the number of configured serving cells exceeds a maximum specified number of serving cells in the enhanced processing time capability, determine the maximum number of transport blocks based on an assumption that a maximum of the number of transport blocks per slot mapped to a specified number of serving cells is received from a configured serving cell having a lowest index number.

4. The UE of claim 1, wherein the one or more processors are configured to cause the UE to:
when the number of configured serving cells is less than a maximum specified number of serving cells but greater than minimum specified number of serving cells in the enhanced processing time capability, determine the maximum number of transport blocks based on an assumption that a number of transport blocks per slot mapped to the minimum specified number of serving cells is received from a configured serving cell having a lowest index number.

5. The UE of claim 4, wherein the minimum specified number of serving cells is greater than 1.

6. The UE of claim 1, wherein the one or more processors are configured to cause the UE to:
receive, from the base station, a serving cell configuration that identifies the configured serving cells that support the enhanced processing time capability.

7. The UE of claim 6, wherein the one or more processors are configured to cause the UE to:
determine the number of configured serving cells that support the enhanced processing time capability based on a processingType2Enabled indication in a PDSCH-ServingCellConfiguration received by way of radio resource control signaling from the base station.

8. The UE of claim 1, wherein the one or more processors are configured to cause the UE to:
signal the enhanced processing time capability using a ProcessingParameters information element.

9. A method, comprising:
signaling an enhanced processing time capability and fallback type to a base station, wherein the enhanced processing time capability includes respective numbers of transport blocks per slot a UE can process mapped to different respective specified numbers of serving cells;
determining a number of configured serving cells that support the enhanced processing time capability;
determining, based on the number of configured serving cells, a maximum number of transport blocks per slot that will be communicated between the UE and the configured serving cells, wherein when the number of configured serving cells is less than a maximum number of serving cells but greater than minimum number of serving cells specified in the enhanced processing time capability, the maximum number of transport blocks is determined based on an assumption that a number of transport blocks per slot mapped to the minimum specified number of serving cells is received from a configured serving cell having a lowest index number; and
determining a fallback behavior based on the determined maximum number of transport blocks per slot and the fallback type.

10. The method of claim 9, comprising:
when the number of configured serving cells is less than or equal to a specified number of serving cells in the enhanced processing time capability, determining the maximum number of transport blocks based on an assumption that a number of transport blocks per slot mapped to the specified number of serving cells in the enhanced processing time capability is received from all of the configured serving cells.

11. The method of claim 9, comprising:
when the number of configured serving cells exceeds a maximum specified number of serving cells in the enhanced processing time capability, determining the maximum number of transport blocks based on an assumption that a maximum of the number of transport blocks per slot mapped to a specified number of serving cells is received from a configured serving cell having a lowest index number.

12. The method of claim 9, wherein the minimum specified number of serving cells is greater than 1.

13. The method of claim 9, comprising:
when the number of configured serving cells exceeds a maximum specified number of serving cells in the enhanced processing time capability, refraining from following fallback behavior specified by the fallback type.

14. The method of claim 9, comprising:
receiving, from the base station, a serving cell configuration that identifies the configured serving cells that support the enhanced processing time capability.

15. The method of claim 14, comprising:
determining the number of configured serving cells that support the enhanced processing time capability based on a processingType2Enabled indication in a PDSCH-ServingCellConfiguration received by way of radio resource control signaling from the base station.

16. The method of claim 9, comprising:
signaling the enhanced processing time capability using a ProcessingParameters information element.

17. A processor, configured to, when executing instructions stored in a memory:
receive signaling from a user equipment (UE) communicating an enhanced processing time capability and fallback type, wherein the enhanced processing time capability includes respective numbers of transport blocks per slot the UE can process mapped to different respective specified numbers of serving cells; and
cause configuration of serving cells for communication with the UE based on the signaling,
determine a maximum number of transport blocks to transmit based on an assumption that a number of transport blocks per slot mapped to the minimum specified number of serving cells is transmitted from a configured serving cell having a lowest index number when a number of configured serving cells is less than a maximum number of serving cells but greater than minimum number of serving cells specified in the enhanced processing time capability.

18. The processor of claim 17, wherein the signaling comprises a ProcessingParameters information element.

* * * * *

UNITED STATES PATENT AND TRADEMARK OFFICE
CERTIFICATE OF CORRECTION

| | | |
|---|---|---|
| PATENT NO. | : 12,143,971 B2 | |
| APPLICATION NO. | : 17/435835 | |
| DATED | : November 12, 2024 | |
| INVENTOR(S) | : Debdeep Chatterjee et al. | |

It is certified that error appears in the above-identified patent and that said Letters Patent is hereby corrected as shown below:

On the Title Page

Column 1, Item (65) Under Related U.S. Application Data; Please add U.S. Provisional Application number 62/826,890 filed on March 29, 2019

Signed and Sealed this
Tenth Day of December, 2024

Katherine Kelly Vidal
*Director of the United States Patent and Trademark Office*